United States Patent [19]
Hosaka

[11] Patent Number: 5,442,611
[45] Date of Patent: Aug. 15, 1995

[54] METHOD OF RECORDING INFORMATION ON RECORD MEDIUM HAVING DATA RECORD REGION AND FILE MANAGEMENT INFORMATION RECORD REGION

[75] Inventor: Naoki Hosaka, Tokyo, Japan

[73] Assignee: Olympus Optical Co., Ltd., Tokyo, Japan

[21] Appl. No.: 55,309

[22] Filed: May 3, 1993

[30] Foreign Application Priority Data

May 7, 1992 [JP] Japan .................. 4-114850

[51] Int. Cl.⁶ ............................... G11B 7/00
[52] U.S. Cl. ...................... 369/48; 369/58; 369/59; 369/47
[58] Field of Search ............ 369/48, 49, 47, 54, 369/58, 59, 32, 53, 124; 360/72.1, 72.2; 235/454, 487, 494

[56] References Cited

U.S. PATENT DOCUMENTS

| | | |
|---|---|---|
| 4,868,806 | 9/1989 | Sakagami .................. 369/58 |
| 4,998,009 | 3/1991 | Iijima et al. ................ 369/58 |
| 5,111,444 | 5/1992 | Fukushima et al. ........ 369/59 |
| 5,214,781 | 5/1993 | Miki et al. ................. 369/59 |

FOREIGN PATENT DOCUMENTS 0284037 9/1988 European Pat. Off. .......... 369/58

Primary Examiner—Georgia Y. Epps
Assistant Examiner—Muhammad N. Edun
Attorney, Agent, or Firm—Stevens, Davis, Miller & Mosher

[57] ABSTRACT

In a method of recording actual data of files on a write-once type record medium such as an optical card under the control of file management information including file name and cluster chain management information, the file management information is first read out of a file management information record region of the record medium, cluster chain management information is formed in accordance with the file management information and is stored in a record area which is provided separately from said record medium, and then the actual data of a file is recorded in successive clusters in the data record region of the record medium. Further, a file name and a file length of the file and a head cluster address of the actual data of the file are recorded on the record medium. The cluster chain management information is formed on the basis of file names, file lengths and head cluster addresses read out of the record medium. It is no longer necessary to record the cluster chain management information on the record medium, and therefore the data record region of the record medium can be utilized optimally.

11 Claims, 9 Drawing Sheets

FIG_3

| A A A | 7000 |  | n |
|-------|------|--|-----|
| B B B | 1500 |  | n+4 |
| C C C | 200  |  | n+6 |

FIG_4

| n   | n+1 | n+2  | n+3 | n+4 | n+5 | n+6 | n+7 |
|-----|-----|------|-----|-----|-----|-----|-----|
| n+8 | n+9 | n+10 |     |     |     |     |     |
|     |     |      |     |     |     |     |     |

FIG_5

FIG_6

FIG_7

*FIG. 8*

| 1 | 2 | 3 | 4 | 5 | 6 | <END> | <EMP> | <EMP> | <EMP> | <EMP> |
|---|---|---|---|---|---|-------|-------|-------|-------|-------|
| 0 | 1 | 2 | 3 | 4 | 5 | 6     | 7     | 8     | 9     | 10    |

*FIG. 9*

| 1 | 2 | 3 | 4 | 5 | 6 | <END> | 8 | <END> | <EMP> | <EMP> |
|---|---|---|---|---|---|-------|---|-------|-------|-------|
| 0 | 1 | 2 | 3 | 4 | 5 | 6     | 7 | 8     | 9     | 10    |

*FIG. 10*

| 1 | 2 | 3 | 4 | 5 | 6 | <END> | 8 | <END> | <END> | <EMP> |
|---|---|---|---|---|---|-------|---|-------|-------|-------|
| 0 | 1 | 2 | 3 | 4 | 5 | 6     | 7 | 8     | 9     | 10    |

METHOD OF RECORDING INFORMATION ON RECORD MEDIUM HAVING DATA RECORD REGION AND FILE MANAGEMENT INFORMATION RECORD REGION

BACKGROUND OF THE INVENTION

1. Field of the Invention

The present invention relates to a method of recording information on a record medium having a data record region for recording data of files in a plurality of clusters and a file management information record region for recording file management information for managing the files recorded on the record medium.

2. Related Art Statement

Nowadays there have been developed various kinds of information record mediums for use in information recording and reproducing apparatuses. However, existing operating systems (OS) have been designed such that the record mediums such as magnetic disk which were existent at the time of designing the operating system are treated. Therefore, the existing operation systems are not effectively used for newly developed record mediums.

For instance, the opto-magnetic disk and high record density magnetic disk which have been developed recently have a very large record capacity such as several hundreds megabytes (MB). Contrary to this, the ordinary magnetic disk has a record capacity of only several tens of megabytes. Therefore, when the optomagnetic disk or high record density magnetic disk is used as the information record medium, the data record capacity is materially increased. Then, it is difficult or impossible to manage directly a large amount of data under the control of the existing OS which has been developed for treating the ordinary magnetic disk. In order to avoid such a drawback, it has been proposed to divide a large amount of data area into a plurality of blocks each having a data amount which corresponds to that of the ordinary magnetic disk. Then, the OS can treats the opto-magnetic disk or high record density magnetic disk by assuming that a plurality of ordinary magnetic disks are provided. In this manner, the newly developed record mediums can be utilized by slightly changing the existing OS.

In general, in case of using the record medium which could not be directly treated by the existing OS, one might consider to provide a working record region and to change a basic portion of the existing OS. However, in practice, an operation for changing the basic portion of the existing OS is very difficult even for an experienced person who is not a designer of the relevant OS. Therefore, as stated above, the basic portion of the OS is not changed, but a control program for a particular record medium is prepared, and this control program is patched on the OS. This control program may be easily prepared by the user for a newly developed record medium, because the basic portion of the OS is not changed. In this manner, the single OS may be utilized for treating various record mediums.

In almost all operating systems, the record medium is treated such that one or more sectors are treated as a single cluster which constitutes a minimum data unit, and files having various lengths are formed by using one or more clusters. In case of recording a plurality of files on the record medium, these files are successively recorded from the first record region toward the last record region. Once a file is recorded on the record medium, a title of file (file name) can be altered, a record position can be changed and the file can be erased. Once a file is erased, a new file may be recorded at a position in which said erased file was recorded. That is to say, the data can be rewritten.

When the files are recorded and erased in the manner explained above, the files are no more recorded successively on the record medium. In other words, the data could not be recorded in successive clusters continuously, so that it is necessary to store file management information representing positions of all the clusters. In practice, an address of a cluster is denoted by one or two bytes, and a table of all addresses of clusters in which the data are recorded has to be recorded on the record medium. By using such an address table, it is possible to manage the cluster chain information and cluster utility information for managing the files. By utilizing such an address table, it is allowed that the data can be recorded at arbitrary positions on the record medium, and thus the operation for recording new files and erasing old files can be carried out at will. The above mentioned address table is called the cluster chain management information.

Recently there have been proposed new types of write-once type record media such as optical disks and optical cards on which the data can be recorded with a very high density. However, the existing operating systems could not treat these newly developed record mediums. In the write-once type optical record medium, once recorded data could not be rewritten and the recording is carried out as a unit of a sector regardless of the length of data. In case of preparing a control program for such optical record mediums, the record mediums have to be assumed to be rewritable. However, in practice, the optical record medium such as the optical disk and optical card could not rewrite the data. Therefore, the cluster chain management information could not be rewritten, and thus there is a problem that a larger part of the record region is used to record the file managing information including the cluster chain management information.

For instance, when a file name is to be changed in the write-once type record medium in which the recorded data could not be erased, it is necessary to record a new file name in a new file management information record area, and even when a file is erased, the record area on which the relevant file has been recorded could not be utilized to record a new file, but the cluster chain management information has to be recorded. That is to say, since the cluster chain management information is changed frequently, a substantial part of the record region is occupied by the cluster chain management information. In this connection, it should be noted that one item of cluster chain management information is recorded in a single sector even if this information has a small length such as one or two bytes. In this manner, when the file is rewritten frequently, the record region on the record medium is used for recording the file management information.

Furthermore, when the cluster chain management information for denoting a series of clusters constituting a file is recorded on the record medium, it is also necessary to prepare a special record area for recording information representing that the cluster chain management information is changed. Apparently this further reduces the effective data record area. Moreover, a finite time is required for recording the cluster chain management information on the record medium, so that the recording operation is prolonged by that time. This might be a problem when the speed for recording the data on the record medium is low.

SUMMARY OF THE INVENTION

The present invention has for its object to provide a novel and useful method of recording information on a record medium, in which the information can be recorded on a write-once type record medium in an efficient manner without reducing a data record area on the record medium by providing a control program in an existing operating system which has been designed for treating the rewritable type record medium According to the invention, a method of recording information on a record medium including a data record region for recording actual data of files in a plurality of clusters and a file management information record region for recording file management information comprises the steps of:

reading said file management information out of said file management information record region of the record medium;

forming cluster chain management information from said file management information;

storing said cluster chain management information on a record area which is provided separately from said record medium;

recording actual data of a file in successive clusters in said data record region of said record medium; and recording, in said file management information record region of said record medium, said file management information including a file name of said file, a file length of said file and a head cluster address from which the actual data of said file is recorded; whereby said cluster chain management information is formed on the basis of said read out file name, file length and head cluster address.

In the method according to the invention, when the write-once type record medium is used, the cluster chain management information is not recorded on the record medium, so that the data record area on the record medium can be utilized optimally. Further, a time necessary for recording the cluster chain management information can be saved. This advantage is also manifest during the reproduction of the information out of the record medium which may be write-once type or rewritable type.

DESCRIPTION OF THE PREFERRED EMBODIMENTS

Figure 1:
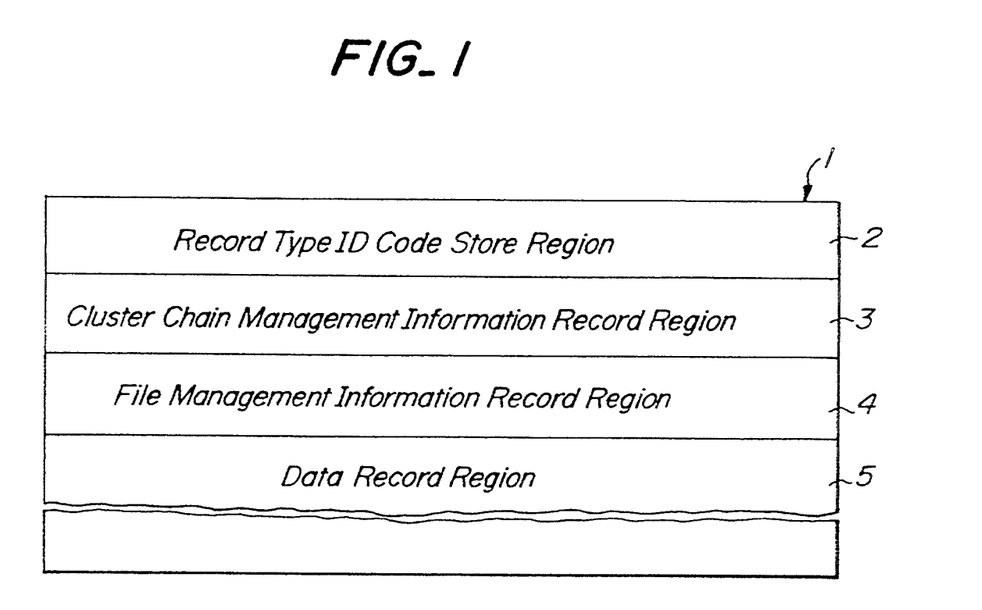
FIG. 1 is a schematic view showing the information record regions of the rewritable type record medium on which the information is recorded by using the operating system designed for the rewritable type record medium.

Before explaining the embodiments of the present invention, the principle of the information recording method according to the invention will be first explained with reference to FIGS. 1 to 5. FIG. 1 is a schematic view showing information record regions on a rewritable type record medium on which information is recorded in accordance with an operating system (OS) which is developed for the rewritable type record medium. It should be noted that this OS is designed for forming a file on the rewritable type record medium, but has no special control program for treating the write-once type record medium.

A record medium 1 comprises four regions 2 to 5 which extend in a longitudinal direction of the record medium. The region 2 is a record type identification code storing region, the region 3 is a cluster chain management information record region, the region 4 is a file management information record region and the region 5 is a data region on which actual data of files is recorded. The record type ID code store region 2, cluster chain management information record region 3 and file management information record region 4 constitute a file management information record region.

Figure 2:
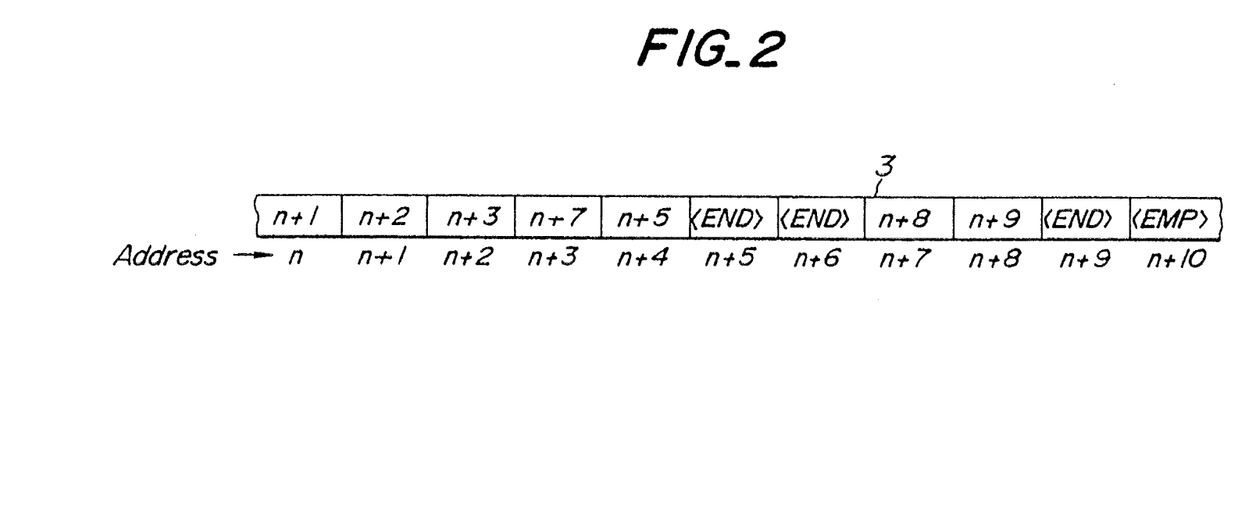
FIG. 2 is a schematic view illustrating the cluster chain management information recorded on the cluster chain management information record region shown in FIG. 1.

FIG. 2 is a schematic view illustrating an example of cluster chain management information recorded on the cluster management information record region 3. In FIG. 2 a portion of the cluster management information record region 3 has addresses from n to n+10. Each of these addresses corresponds to a respective one of the clusters in the data record region 5. When address data is recorded in an address position of the cluster chain management information record region 3, it is represented that a cluster denoted by an address of the relevant address position is followed by a cluster which is denoted by the address data. For instance, when address data n+1 is recorded in an address position having an address n as shown in FIG. 2, a cluster in the data record region 5 having an address n is followed by a cluster having an address n+1. Similarly, the cluster having the address n+1 is followed by a cluster having an address n+2, because in the address position having the address n+1 there is recorded address data n+2. When (END) is recorded in an address position, it is shown that no cluster is followed. In FIG. 2, (END) is recorded in an address position having an address n+5, so that the relevant file is ended by a cluster having an address n+5. Further (EMP) represents that a relevant cluster is not used. As a case may be, it is possible to record a special mark in an address position in the cluster chain management information record region 3 when a relevant cluster in the data region 5 is damaged and could not be used.

Figure 3:
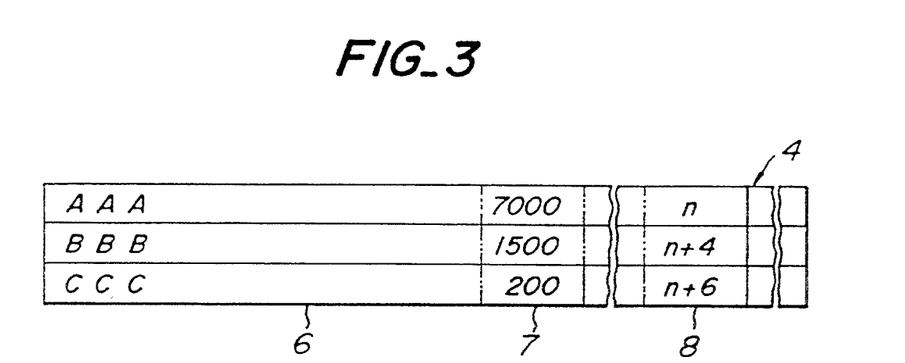
FIG. 3 is a schematic view depicting the file management information recorded on the file management information record region shown in FIG. 1.

FIG. 3 is a schematic view showing an example of the file management information record region 4. The file management information is file record position information and includes a name of a file, i.e. file name 6, a file data length 7 denoting a length of the relevant file and a head cluster address from which the relevant file is recorded. The file management information may further contain a record date and time, an access priority for the file, attributes of the file and so on, although these data are not shown in FIG. 3. In this example there are recorded three files having file names AAA, BBB and CCC, respectively. From FIGS. 2 and 3, it can be known that these files have the following cluster constructions.

File. AAA: n-n+1-n+2-n+3-n+7-n+8-n+9
File. BBB: n+4-n+5
File. CCC: n+6

Figure 4:
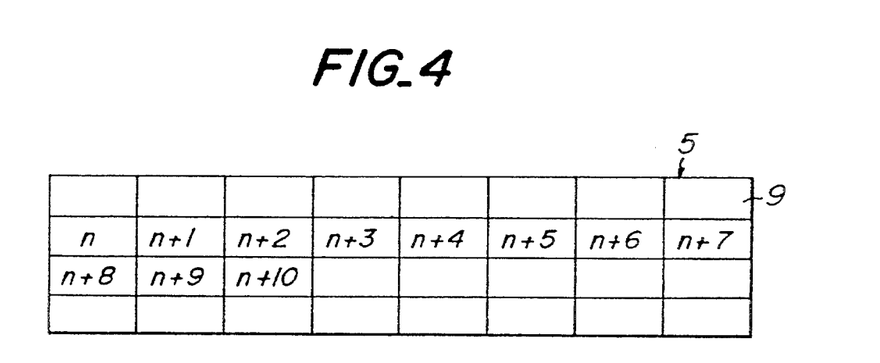
FIG. 4 is a schematic view representing the clusters constituting the data recorded on the data record region shown in FIG. 1.

FIG. 4 is a schematic view illustrating the construction of the data record region 5. In this example, the data record region 5 comprises a number of tracks and each track have eight clusters 9. One cluster 9 has a capacity of 1024 bytes. The clusters having addresses n to n+10 correspond to address positions n to n+10 of the cluster chain management information shown in FIG. 2.

Figure 5:
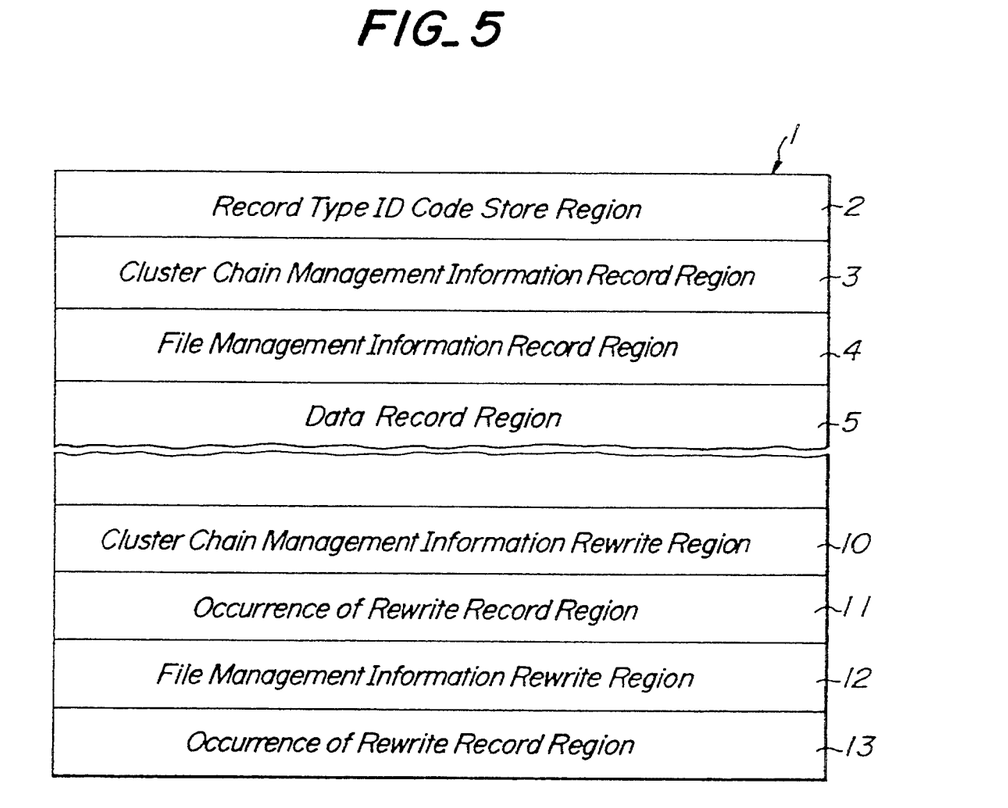
FIG. 5 is a schematic view illustrating the record regions on the write-once type record medium on which the information is recorded in accordance with the operating system for the rewritable record medium without using the method according to the invention.

FIG. 5 is a schematic view representing the data record region 5 of the write-once type record medium on which the file data is recorded by using the existing OS developed for treating the rewritable type record medium. In this case, the information record method explained above is utilized for the write-once type record medium, so that the write-once type record medium has to be used as the rewritable type record medium. Therefore, in addition to the above explained record regions 2 to 5 there are provided record regions 10 to 13. The region 10 is a cluster chain management information rewrite region for recording rewritten cluster chain management information, the region 11 is an occurrence of rewrite record region for recording data which denotes that the cluster chain management information has been rewritten, the region 12 is a file management information rewrite region for rewriting the file management information, and a region 13 is an occurrence of rewrite record region for recording data presenting that the file management information has been rewritten.

As can be understood from FIG. 5, in the known method, it is necessary to provide the additional regions 10 to 13 for performing the rewriting, and thus a substantial area of the data record region 5 has to be occupied by these record regions. It may be considered that the regions 10 and 11 and/or regions 12 and 13 may be combined by changing the recording method, but even in such a case, a part of the data record region 5 has to be used for recording the rewriting data.

Figure 6:
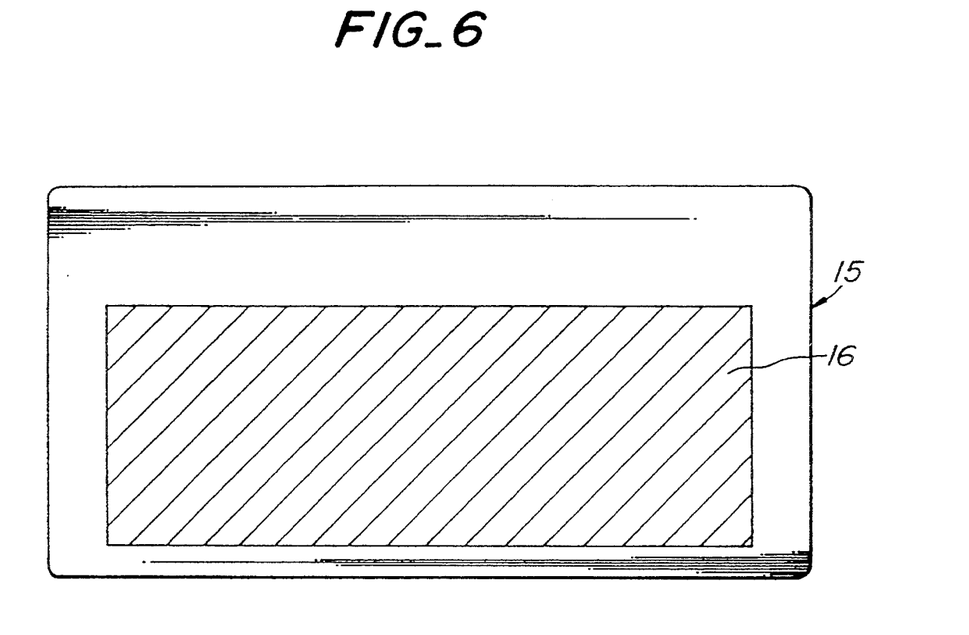
FIG. 6 is a plan view showing an optical card which can be advantageously used in the method according to the invention.

FIG. 6 is a plan view depicting an optical card which can be advantageously used in the method according to the invention. An optical card 15 has an information record region 16. In the information record region 15 there are provided a plurality of tracks extending in a longitudinal direction of the optical card 15. It is possible to record data on a track by piercing holes optically, so that once recorded data could not be rewritten. A single track is divided into a plurality of small sections to form one or more sectors. The number of sectors provided in a single track is determined by selecting any one of previously prepared numbers. When the information is recorded on the optical card or is read out of the optical card, a sector constitutes a minimum information unit, and a single cluster is composed of one or more sectors.

Figure 7:
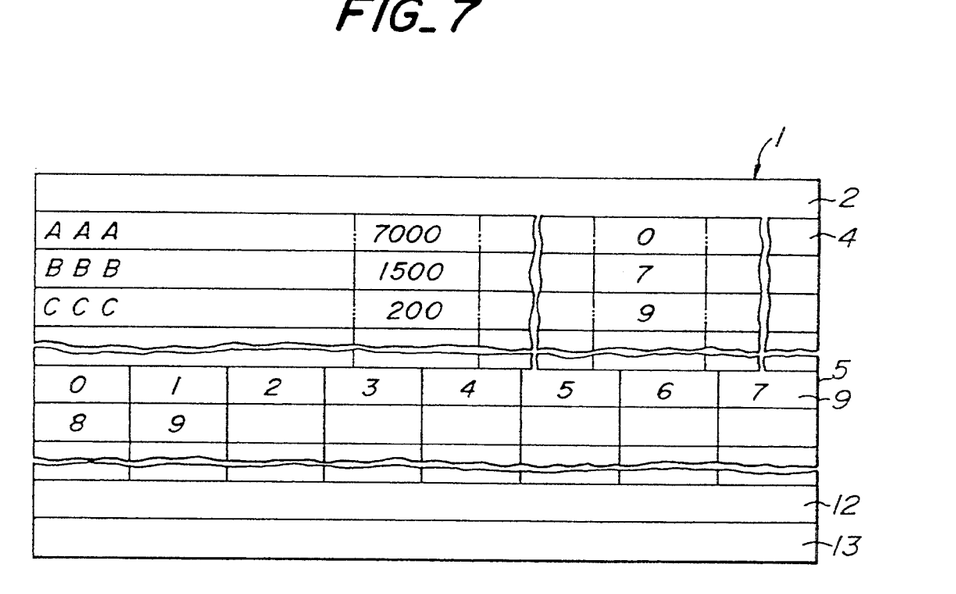
FIG. 7 is a schematic view depicting an embodiment of the information record regions on the optical card on which the information is recorded by the method according to the invention by using the operating system developed for the rewritable type record medium.

FIG. 7 is a schematic view showing an embodiment of the information record region upon recording the information on the write-once type record medium by the method according to the invention. In FIG. 7 the same information as that shown in FIGS. 2 and 3 is recorded. It should be noted that various rectangles shown in FIG. 7 do not represent a magnitude or length of data, but denote the arrangement of various kinds of information.

In the present embodiment, the operating system OS does not inherently contain a special program for treating the write-once type record medium, and thus it is necessary to prepare a control program for the write-once type record medium. This control program is to form on a working memory separate from the record medium an imaginary cluster chain management information which is not actually recorded on the record medium, and the OS treats said imaginary cluster chain management information as if it is recorded on the record medium.

Figure 8:
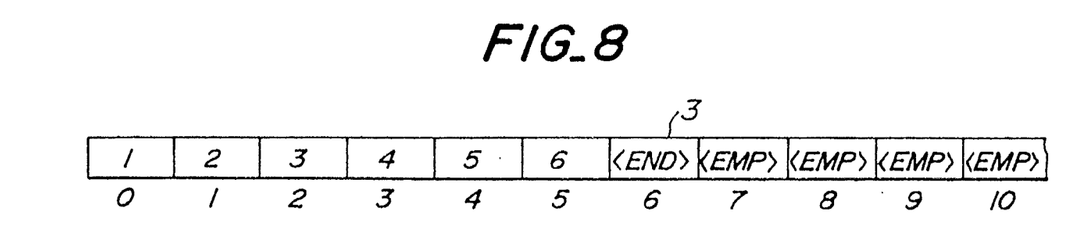
FIGS. 8, 9 and 10 are schematic views representing the imaginary cluster chain management information formed by the control program in the method according to the invention.

Now it is assumed that no file is recorded on the optical card. In this condition, all address positions of the imaginary cluster chain management information are (EMP). Now a first file AAA is recorded on the data record region 5 from a first cluster 9 having an address 0. Then, file management information is recorded in the file management information record region 4. That is to say, a file name AAA, a file length 7000 bytes and a head cluster address 0 are recorded on a first column of the file management information record region 4. Since a single cluster is 1024 bytes, this file requires seven clusters, so that in the imaginary cluster chain management information record region 3, addresses 1 to 6 are recorded at address positions 0 to 5, and (END) is recorded at an address position 6, as depicted in FIG. 8.

Figure 9:
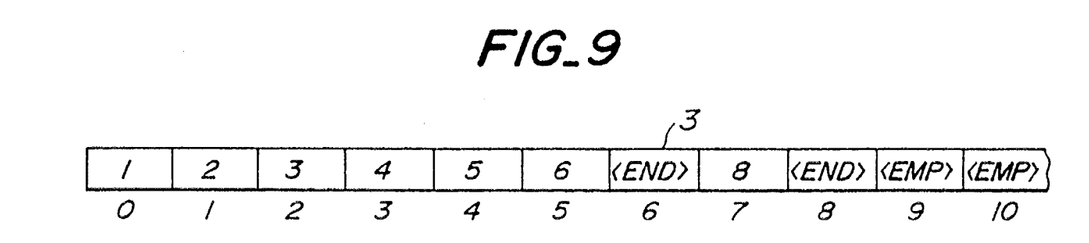

Then, OS recognizes from the content of the imaginary cluster chain management information that clusters in the data record region 5 having addresses except for addresses 0 to 6 are all empty or not used. Next, a second file BBB having a length of 1500 bytes is recorded on the optical card from a cluster in the data record region having an address 7. In a second column of the file management information record region 4, a file name BBB, a file length of 1500 and a head cluster address 9 are recorded. Since this file BBB requires two clusters, in the imaginary cluster chain management information, an address 8 is recorded in an address position having an address 7, and (END) data is recorded in an address position having an address 8, as illustrated in FIG. 9.

Then, the OS judges from the imaginary cluster chain information that clusters in the data record region 5 having addresses other than 0 to 8 are all empty. Therefore, a next file CCC is recorded in a cluster 9 in the data record region 5. That is to say, in a third column of the file management information record region 4, there are recorded the file name CCC, file length of 200 and a head cluster having an address 9. Then, in the imaginary cluster chain information record region 3 shown in FIG. 10, (END) mark is recorded at an address position having an address 9.

Figure 10:
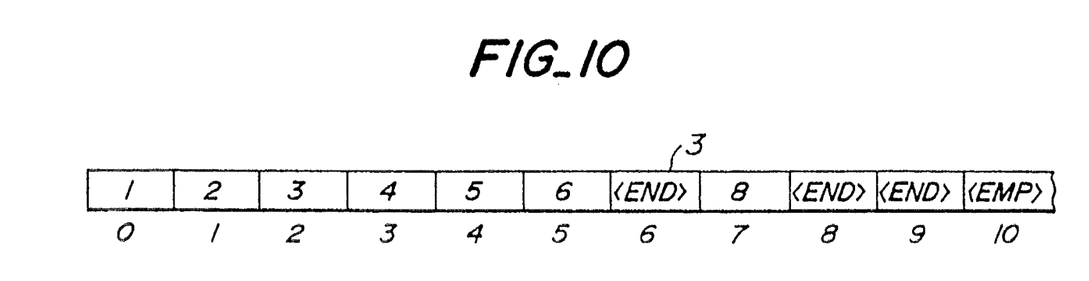

Now the operation for reproducing information from the optical card on which the files AAA, BBB and CCC are recorded in the manner explained above will be explained. At first, the file management information is read out of the file management information record region 4 of the optical card to derive the file names, file lengths and head cluster addresses. As explained above, the file AAA has the file length of 7000 bytes and is recorded in the first seven clusters having the addresses 0 to 6, so that the control program can judge that the actual data of this file AAA has been recorded in the clusters having the addresses 0 to 6. Similarly the control program can derive that the actual data of the second file BBB has been recorded in the eighth and ninth clusters having the addresses 7 and 8 and the actual data of the third file CCC has been recorded in the tenth cluster having the address 9. In this manner, the imaginary cluster chain management information shown in FIG. 10 is formed by the control program and is stored in a memory which is arranged separately from the optical card. Then, the OS can treat the thus formed and stored imaginary cluster chain management information like the cluster chain management information recorded on the rewritable type record medium shown in FIG. 3, so that the file data can be reproduced from the optical carding like manner as the file data recorded on the rewritable type record medium.

According to the invention, it is no more necessary to provide on the record medium the management information record regions 3, 10 and 11 shown in FIG. 4, and thus it is not necessary to record the cluster chain management information on the record medium. Therefore, the data region of the write-once type record medium such as the optical card can be utilized optimally, and the limitation that the particular function of the record medium could not be utilized efficiently can be minimized. In this manner, the maximum data record region can obtained on the record medium and the recording and reproducing operation can be performed efficiently.

In the above embodiment, the optical card is used as the write-once type record medium, but according to the invention other write-once type record media such as the optical disk can be equally utilized. Moreover, in the method according to the invention, it is also possible to use the rewritable type record medium. In such a case, the above mentioned advantages of the present invention can be equally obtained. Moreover, by utilizing the rewriting property, the following modifications may be conceived.

Figure 11:
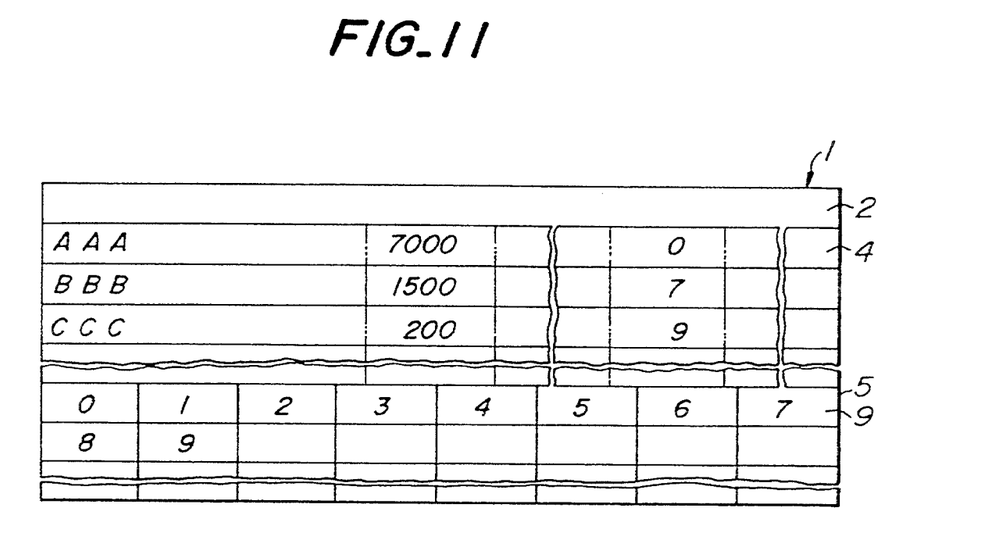
FIG. 11 is a schematic view illustrating another embodiment of the information record regions on the optical card on which the information is recorded by the method according to the invention by using the operating system developed for the rewritable type record medium.

FIG. 11 illustrates such a modification in which the file management rewrite region 12 and occurrence of rewrite record region 13 are deleted from the file information record region provided on the rewritable type record medium. In this case, the whole recording and reproducing operation time can be shortened even if the operation for recording and reproducing the data on and from the record medium could not be performed at a high speed, because an amount of data to be recorded on and reproduced from the record medium can be reduced.

Figure 12:
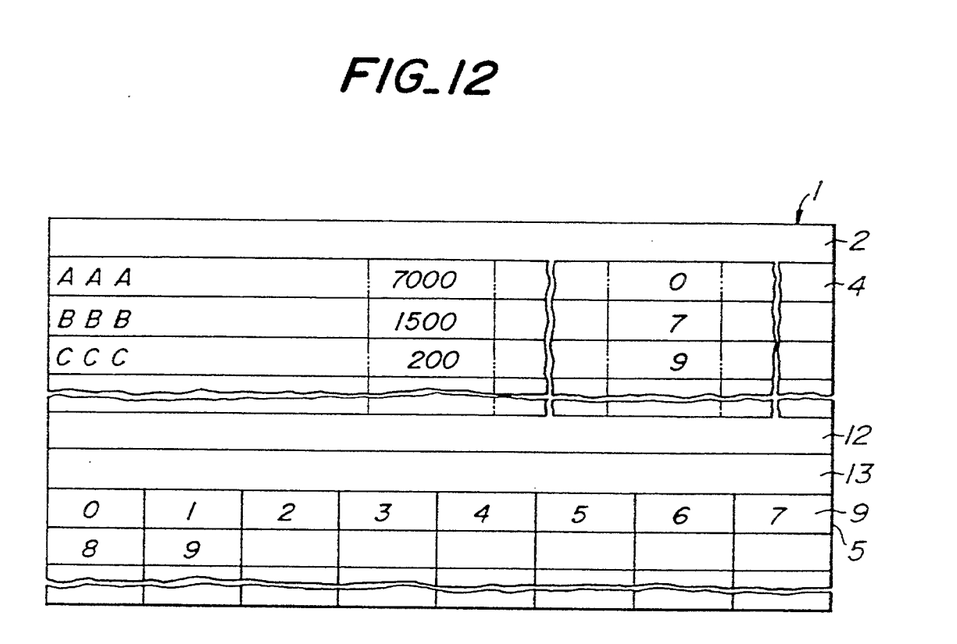
FIG. 12 is a schematic view showing still another embodiment of the information record regions on the optical card on which the information is recorded by the method according to the invention by using the operating system developed for the rewritable type record medium.

FIG. 12 is a schematic view depicting another embodiment of the file management information recorded on the write-once type record medium. In the embodiment shown in FIG. 7, the file management rewrite region 12 and occurrence of rewrite record region 13 are provided below the data record region 5, but in the present embodiment, these record regions 12 and 13 are provided between the file management information record region 4 and the actual data record region 5. In this manner, according to the invention, the format of the record regions on the record medium may be varied in various ways. For instance, the file management rewrite region 12 and occurrence of rewrite record region 13 may be combined into a single record region. Further, in the above embodiments, the cluster has a capacity of 1024 bytes, but it may be consist of a different number of bytes. Moreover, the file management information may include one or more record regions other than the above mentioned record regions.

As stated above in detail, in the information recording method according to the invention, the write-once type record medium can be utilized under the control of the operating system which has been designed for treating the rewritable type record medium. In this case, it is not necessary to record the cluster chain management information on the record medium, so that the information record region of the record medium can be optimally used. Further, the recording and reproducing can be performed at a high speed, because the cluster chain management information is not recorded on the record medium, but is formed under the control of the control program. This advantage is also important for the case in which the rewritable record medium is used.

What is claimed is:

1. A method of recording information on a record medium including a data record region for recording actual data of files in a plurality of clusters and a file management information record region for recording file management information including a file name for each of said files, a file length of each of said files and a head cluster address indicating one of said plurality of clusters from which the actual data of each of said files are recorded, said method comprising the steps of:
    (a) reading said file management information out of said file management information record region of the record medium;
    (b) forming cluster chain management information on the basis of said file name, file length and head cluster address of each of said files;
    (c) storing said cluster chain management information on a record area which is provided separately from said record medium;
    (d) recording actual data of a new file in successive ones of said plurality of clusters in said data record region of said record medium; and
    (e) recording, in said file management information record region of said record medium, a file name of said new file, a file length of said new file and a head cluster address indicating one of said plurality of clusters from which the actual data of said new file are recorded.

2. A method according to claim 1, wherein said record medium is formed by a write-once type record medium.

3. A method according to claim 2, wherein said write-once type record medium is formed by an optical card.

4. A method according to claim 1, wherein each of said plurality of clusters of the record medium is formed by one or more sectors and said actual data are recorded in sector units.

5. A method according to claim 1, wherein said record medium is formed by a rewritable type record medium.

6. A method according to claim 1, wherein said step of recording the file management information in said file management information record region further comprises recording rewritten file management information in a file management information rewrite region and recording data denoting that the file management information has been rewritten, in an occurrence of rewrite record region.

7. A method according to claim 6, wherein said file management information rewrite region and occurrence of rewrite record region are provided below said data record region.

8. A method according to claim 6, wherein said file management information rewrite region and occurrence of rewrite record region are provided between said data record region and said file management information record region.

9. A method according to claim 1, wherein said record area which is provided separately from said record medium comprises a working memory.

10. A method according to claim 1, wherein said cluster chain management information is not written on said record medium.

11. A method according to claim 1, wherein said cluster chain management information indicates an allocation of said plurality of clusters among said files.

* * * * *